United States Patent
Jeon

(10) Patent No.: US 12,388,872 B2
(45) Date of Patent: Aug. 12, 2025

(54) SECURITY SETTING DEVICE, METHOD OF SETTING PER-PROCESS SECURITY POLICY, AND COMPUTER PROGRAM STORED IN RECORDING MEDIUM

(71) Applicant: UNIST(ULSAN NATIONAL INSTITUTE OF SCIENCE AND TECHNOLOGY), Ulsan (KR)

(72) Inventor: Yuseok Jeon, Ulsan (KR)

(73) Assignee: UNIST(ULSAN NATIONAL INSTITUTE OF SCIENCE AND TECHNOLOGY) (KR)

(*) Notice: Subject to any disclaimer, the term of this patent is extended or adjusted under 35 U.S.C. 154(b) by 301 days.

(21) Appl. No.: 18/069,801

(22) Filed: Dec. 21, 2022

(65) Prior Publication Data
US 2023/0208883 A1 Jun. 29, 2023

(30) Foreign Application Priority Data
Dec. 28, 2021 (KR) .......................... 10-2021-0190412

(51) Int. Cl.
*H04L 9/40* (2022.01)

(52) U.S. Cl.
CPC .................................... *H04L 63/20* (2013.01)

(58) Field of Classification Search
None
See application file for complete search history.

(56) References Cited

U.S. PATENT DOCUMENTS

| | | | |
|---|---|---|---|
| 8,091,128 B2 | 1/2012 | Yu | |
| 9,060,016 B2 | 6/2015 | Han | |
| 11,379,416 B1* | 7/2022 | Werr | G06Q 10/103 |
| 2008/0127292 A1* | 5/2008 | Cooper | G06F 21/6281 |
| | | | 718/1 |
| 2014/0137184 A1* | 5/2014 | Russello | H04L 63/20 |
| | | | 726/1 |
| 2015/0332043 A1* | 11/2015 | Russello | G06F 11/3466 |
| | | | 726/22 |
| 2016/0117498 A1* | 4/2016 | Saxena | G06F 21/445 |
| | | | 726/26 |
| 2019/0243743 A1* | 8/2019 | Saxena | G06F 21/552 |
| 2022/0179948 A1* | 6/2022 | Prudkovskiy | G06F 21/562 |

FOREIGN PATENT DOCUMENTS

| | | |
|---|---|---|
| CN | 103111627 A | 5/2013 |
| KR | 10-1967663 B1 | 4/2019 |
| KR | 10-2021-0067899 A | 6/2021 |
| KR | 2021-0132545 A | 10/2021 |

* cited by examiner

*Primary Examiner* — Scott B Christensen
(74) *Attorney, Agent, or Firm* — Klarquist Sparkman, LLP

(57) ABSTRACT

One or more embodiments relate to a security setting device, a method of setting a per-process security policy, and a computer program stored in a recording medium to execute the method, and more particularly, to a security setting device configured to protect an electronic device from external attacks to a program by performing static analysis with respect to the program to set security policies for processes included in the program and monitor whether there have been violations on the security policy, a method of security setting, and a computer program stored in a recording medium to execute the method.

15 Claims, 5 Drawing Sheets

SECURITY SETTING DEVICE, METHOD OF SETTING PER-PROCESS SECURITY POLICY, AND COMPUTER PROGRAM STORED IN RECORDING MEDIUM

CROSS REFERENCE TO RELATED APPLICATION

This application is based on and claims priority under 35 U.S.C. § 119 to Korean Patent Application No. 10-2021-0190412, filed on Dec. 28, 2021, in the Korean Intellectual Property Office, the disclosure of which is incorporated by reference herein in its entirety.

FIELD

One or more embodiments relate to a security setting device, a method of setting a per-process security policy, and a computer program stored in a recording medium to execute the method, and more particularly, to a security setting device configured to protect an electronic device from external attacks to a program by performing static analysis with respect to the program to set security policies for processes included in the program and monitor whether there have been violations on the security policy, a method of security setting, and a computer program stored in a recording medium to execute the method.

BACKGROUND

A computer is a device capable of instructing automatic execution of a series of arithmetic operations represented as numerical expressions or a series of logical operations represented as logical languages or storing and processing data. Recently, according to increase in tasks using computers, a plurality of computers are used, which causes various problems such as virus attacks or leakage of physical secrets.

Security programs against virus programs, malignant spywares, and cloaker programs are implemented as software to block intrusion of malignant programs, and delete those malignant programs or cure the computers when the computers are infected by those malignant programs.

Infection by a malignant program may cause decrease in the speed of a computer and problems in using the computer, or worse, the computer may not operate. These security programs operate in real-time in prior to other computer programs to monitor malignant programs and the like, and when there is an invasion, due to work on treatment and deletion thereof, the speed of a computer system decreases.

Existing security programs may identify a program initialization process or a program driving process through a security policy or passive analysis applicable to the entire program, and may be separately applied to an initialization or driving process of a program. However, virus and the like avoiding such a rule have been generated. Therefore, it is required that devices such as computers are protected using more subdivided technologies.

SUMMARY

To solve problems including the aforementioned problems, the present disclosure provides a method of security setting to protect an electronic device from external attacks to the program by performing analysis with respect to a program to set security policies for processes included in the program and monitor whether there have been violation on the security policies, a security setting device, and a computer program stored in a recording medium to execute the method. However, this is merely an example, and the scope of the disclosure is not limited thereto.

Additional aspects will be set forth in part in the description which follows and, in part, will be apparent from the description, or may be learned by practice of the presented embodiments of the disclosure.

According to one or more embodiments of the disclosure, a method of setting security policy includes performing static analysis with respect to a first program and dividing the first program, by a security setter of an electronic device, extracting one or more processes included in the first program according to a result of the dividing of the first program, by the security setter, setting a security policy for each of the one or more processes and storing the security policy, by the security setter, obtaining information regarding a process or thread being called, by the security setter, when the first program is executed, determining whether the security policy has been violated using the information regarding the process or thread being called, by the security setter, generating and recording a notification message regarding the violation on the security policy when violation on the security policy is detected as a result of determination by the security setter, and transmitting, by the security setter, the notification message to an address of a preset manager.

The information regarding the process or thread being called includes at least one of information regarding a call time point, an input value, and an input value.

In the determining whether the security policy has been violated, the determination may be based at least one of whether the first process is executed in a section other than a use code section of the first process, whether an input value of the first process exceeds a preset input normal range, whether an output value of the first process exceeds a preset input normal range, and a use resource during execution of the first process exceeds a preset resource normal range.

The storing of the security policy includes setting, by the security setter, a security policy according to an operating system using a table regarding security of the operating system installed in the electronic device.

The extracting of the one or more processes or threads includes extracting, by the security setter, one or more processes or threads calling the system from among the processes and threads of the first program.

The obtaining of the information regarding the process or thread being called includes obtaining information regarding the processes or threads being called by a monitor included in the electronic device.

According to one or more embodiments, after the generating and recording of the notification message, the method further includes pausing execution of the first program and not executing the first program in spite of an instruction for execution of the first program, by the security setter.

According to an aspect of the disclosure, provided is a computer program stored in a recording medium to execute the aforementioned method using a computer.

Aspects, features, and benefits other than the description will be clearly understood from detailed descriptions, claims, and the accompanying drawings.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
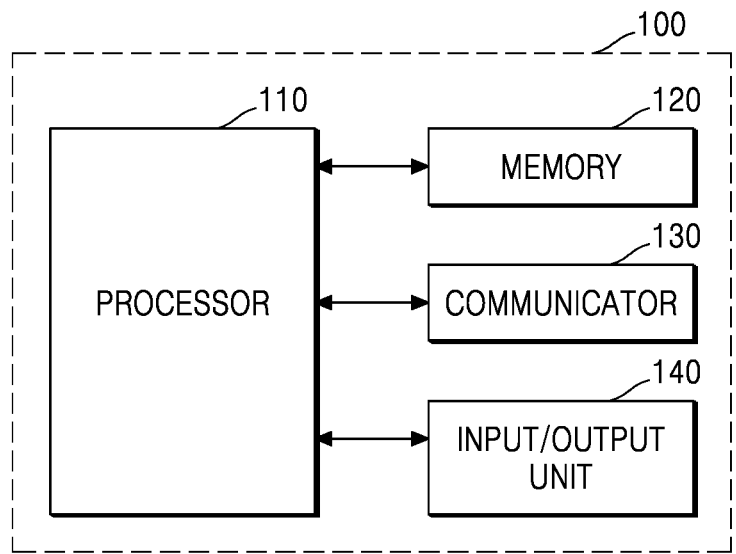
FIG. 1 is a diagram for describing a configuration and operations of a security setting device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

In the following embodiments, terms such as "first," and "second" are not used in a limiting sense but used to distinguish one component from other components. In addition, unless explicitly intended otherwise, singular forms encompass plural forms. Furthermore, terms such as "include," "comprise," or "have" indicate the existence of features or components written in the specification, and are not to preclude the possibility of addition of one or more other features or components.

In the drawings, for convenience of explanation, sizes of components may be exaggerated or reduced. For example, sizes and thicknesses of components in the drawing are arbitrarily illustrated for convenience of explanation, and therefore, the disclosure is not limited to the illustration.

In the following embodiments, when a portion such as a region, a component, a unit, a block, or a module is referred to as being on or above another portion, the portion may be directly on the another portion, but another region, component, unit, block, or module may be therebetween. In the following, when a region, a component, a unit, a block, or a module is referred to as being connected to another region, component, unit, block, or module, the region, component, unit, block, or module may be directly connected to the another region, component, unit, block, or module, but may also be indirectly connected to the another region, component, unit, block, or module with another region, component, unit, block, or module therebetween.

Figure 2:
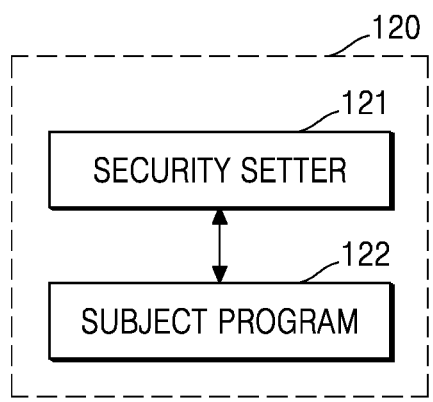
FIG. 2 is a block diagram of a memory according to an embodiment.
Figure 3:
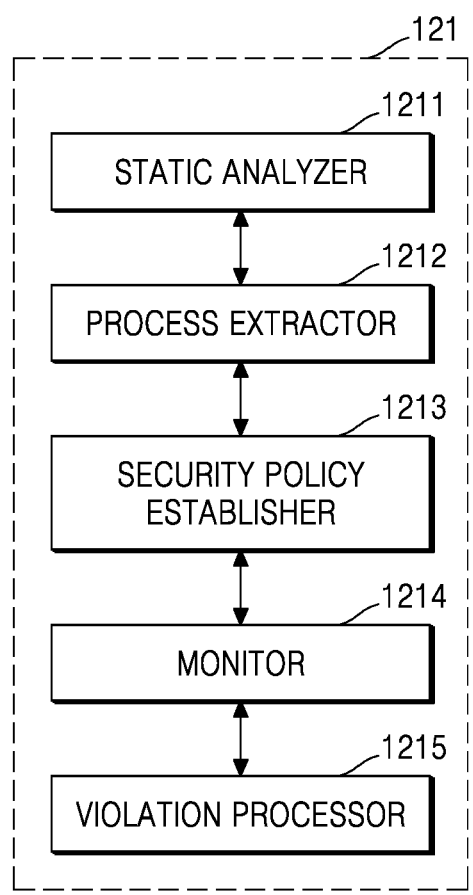
FIG. 3 is a block diagram of a security setter included in a memory.

FIG. 1 is a diagram for describing a configuration and operations of a security setting device 100 according to an embodiment, and FIG. 2 is a block diagram of a memory 120 according to an embodiment. FIG. 3 is a block diagram of a security setter 121 included in the memory.

As shown in FIG. 1, the security setting device 100 may include a processor 110, a memory 120, a communicator 130, and an input/output unit 140.

However, the components shown in FIG. 1 are not necessarily included as components of the security setting device 100. The security setting device 100 may be implemented by more components than the components shown in FIG. 1; and on the contrary, the security setting device 100 may also be implemented by less components than the components shown in FIG. 1. The security setting device 100 may include a user terminal, a server, a security setting system, or another device.

According to an embodiment, the processor 110 controls general operations of the security setting device 100. For example, the processor 110 may generally control the components included in the security setting device 100 by executing programs stored in the security setting device 100.

The processor 110 may split a first program in smaller units by performing static analysis with respect to the first program. The processor 110 may analyze the first program without executing the first program. The processor 110 may make rules to be processed by the first program into a rule profile. The first program may be split into units such as threads, but is not limited thereto and may be split into more various methods. A thread, which is a basic unit using CPU, is a basic unit executed in a process. A code region exists in the process, and the thread may be expressed as a subject executed in the code area. A process has a thread. For example, when a run function is called into a main function, two threads, that is, a main thread and a run thread, are executed.

Here, static analysis indicates analyzing a program without execution, and the static analysis may be executed as a type of versions of a source code, or may be analyzed in an object file type. An automation tool may be used for static analysis.

According to results of static analysis, the processor 110 may extract one or more processes included in the first program. The processor 110 may generate data about the results of static analysis and store the data. The processor 110 may set a security policy for each of the one or more processes and store data related to the security policy. Here, the security policy may include conditions when the processes or threads are called or executed. The security policy may include: conditions regarding a time point at which a process or thread is called; conditions regarding a subject calling the process or thread; conditions regarding a subject called by the process or thread; conditions regarding input values of the process or thread; conditions regarding output values of the process or thread, and the like.

The processor 110 may obtain information regarding a process or thread called when the first program is executed. The information regarding the process or thread may include information obtained while each process or thread is called or executed. The information about the process or thread may include information about a calling target, information about a called target, information about an input value, information about an output value, and the like. The security policy may be set as a condition for a process or a thread based on the above information. Here, the condition includes condition regarding a time point at which a process or thread is called; condition regarding a subject calling the process or thread; condition regarding an object called by the process or thread; condition regarding an input value of the process or thread; condition regarding an output value of the process or thread, and the like.

The processor 110 may determine whether the security policy has been violated using the information regarding the process or thread being called. The processor 110 may detect that a process or thread executed with information other than a condition included in the security policy violates the security policy. The processor 110 may store data for a case in which a violation of the security policy is detected. When violation on the security policy is detected, the processor 110 may generate and record a notification message regarding the violation on the security policy. Here, the notification message may include information regarding the violation on the security policy, and more particularly, may include a program in which the violation on the security policy occurs, a time point at which the violation on the security policy occurs, the number of times of violation on the security policy, and information about an invocation of the violation.

The processor 110 may transmit the notification message to a preset manager. The processor 110 may transmit the notification message to an account of the manager, a device of the manager, and a mail address of the manager, which correspond to the manager.

According to an embodiment, the memory 120 may store programs for processing and controlling of the processor 110, and may store data input to the security setting device 100 or output from the security setting device 100. According to an embodiment, the memory 120 may store components for setting security, and may also store information regarding a security policy. The memory 120 may store a program requiring security setting, and may store a component configured to perform static analysis with respect to the program, a component configured to monitor execution of the program, and the like. The memory 120 may include a database including the aforementioned information.

According to an embodiment, the memory 120 may include at least one type of storage medium from among flash memory type, hard disk type, multimedia card micro type, a card-type memory (e.g., an SD memory or XD memory), random access memory (RAM), static random access memory (SRAM), read-only memory (RAM), electrically erasable programmable read-only memory (EEPRM), programmable read-only memory (PROM), magnetic memory, magnetic disk, and optical disk. In addition, according to an embodiment, programs stored in the memory 120 may be classified in a plurality of modules according to functions.

According to an embodiment, the communicator 130 may communicate with devices outside the processor 110. For example, the communicator 130 may communicate, under control of the processor 110, with an electronic device in which a program requiring security is stored. In addition, the communicator 130 may approach an electronic device in which a program requiring security is stored, through communication with external interfaces, and communicate to analyze the program and set a security policy for the program.

The input/output unit 140 may include a unit for interface with an input/output device. For example, an input device may include a device such as a keyboard or a mouse, and an output device may include a device such as a display configured to display communication sessions of an application. As another example, the input/output unit 140 may be used for interface with a device in which functions for input and output are integrated into one, such as a touchscreen. As more detailed example, the processor 110 of the security setting device 100 may process instructions of a computer program loaded or stored in the memory 120. The processor 110 may display the processing result, data generated during processing, data about the processing process, etc. on the display through the input/output unit 140.

In addition, in other embodiments, the security setting device 100 may include a greater number of components than the number of components shown in FIG. 1. For example, the security setting device 100 may be implemented to include at least some of the aforementioned input/output devices, or may further include other components such as a battery and a charging device configured to provide power to interior components, a sensor, a database, and the like.

As shown in FIG. 2, the memory 120 may include a security setter 121 and a subject program 122. Although the subject program 122 is disclosed as being included in the memory 120, the subject program 122 may also be stored in another electronic device.

The security setter 121 may split the subject program 122 into smaller units (process, thread) by perform static analysis on the subject program 122 stored in the memory 121. The security setter 121 may set the security policy for each process or thread, based on information of properties of at least one process or thread included in the subject program 122. The security setting unit 121 may set a security policy for the program by using the result of static analysis of the program. The security policy for the program may include executable data of the program using the static analysis result. The security setter 121 may detect whether the set security policy has been violated. When violation on the security policy is detected, the security setter 121 may generate information regarding the violation on the security policy as log data. The security setter 121 may generate the notification message based on the log data generated regarding the violation on the security policy. The security setter 121 may transmit the notification message, which is related to the violation on the security policy, to a given account, device, and e-mail address, and the like. As shown in FIG. 3, the security setter 121 may execute the aforementioned operations by including a static analyzer 1211, a process extractor 1212, a security policy establisher 1213, a monitor 1214, and a violation processor 1215.

The static analyzer 1211 may split the first program into smaller units (process, thread) by performing static analysis with respect to the first program. The first program may be split into units such as processes or threads, but is not limited thereto and may be split into more various methods.

Here, static analysis indicates analyzing a program without execution, and the static analysis may be executed as a type of versions of a source code, or may be analyzed in an object file type. An automation tool may be used for static analysis.

The static analyzer 1211 may perform static analysis on a program by using a compiler.

The process extractor 1212 may extract one or more processes or threads included in the first program, according to a result of the static analysis. The process extractor 1212 may acquire information acquired while each process or thread is called or executed according to the static analysis result. The information about the process or thread may include information about a calling target, information about a called target, information about an input value, information about an output value, and the like.

The security policy establisher 1213 may set a security policy for each of the one or more processes or threads and store the security policy. Here, the security policy may include conditions when the processes or threads are called or executed. The security policy may include: conditions regarding a time point at which a process or thread is called; conditions regarding a subject calling the process or thread; conditions regarding an object called by the process or thread; conditions regarding input values of the process or thread; conditions regarding output values of the process or thread, and the like.

The security policy establisher 1213 may check information on the use of a system call function or the like in the program by statically analyzing the program. The security policy establisher 1213 may set executable code sections such as child processes and child threads included in the program by statically analyzing the program. The security policy establisher 1213 may establish a security policy for each process or each thread using such an executable code section. Here, the system call function is an interface for approaching kernels in response to requests of an application program with respect to the service provided by the kernel in an operating system, and may include, for example, fork ( ), vfork ( ), pthread ( ), and the like. Examples of the system call function may vary according to type of an operating system of the device. The system call function may indicate calling and using a routine of the operating system with respect to functions that are not provided in a programming language. Types of the system call function may include process control, file manipulation, device management, device management, information maintenance, communication, and the like.

The static analyzer 1211 may analyze authority and/or resources for each thread and/or process identified using config file (CGF) and/or Call graph and the like. The security policy establisher 1213 may establish the security policy for each process or thread, based on the authority and/or resource confirmed by the static analyzer 1211.

The security policy establisher 1213 may set the security policy for each process or each thread by organizing one or more processes or threads based on initial addresses of one or more processes or threads included in the first program. That is, the security policy of each process may be established based on an initial address value, a required authority value, a required resource value, and the like. In another embodiment, the security policy establisher 1213 may update the security policy such that a new security policy is applied for each start of the process or thread.

Figure 4:
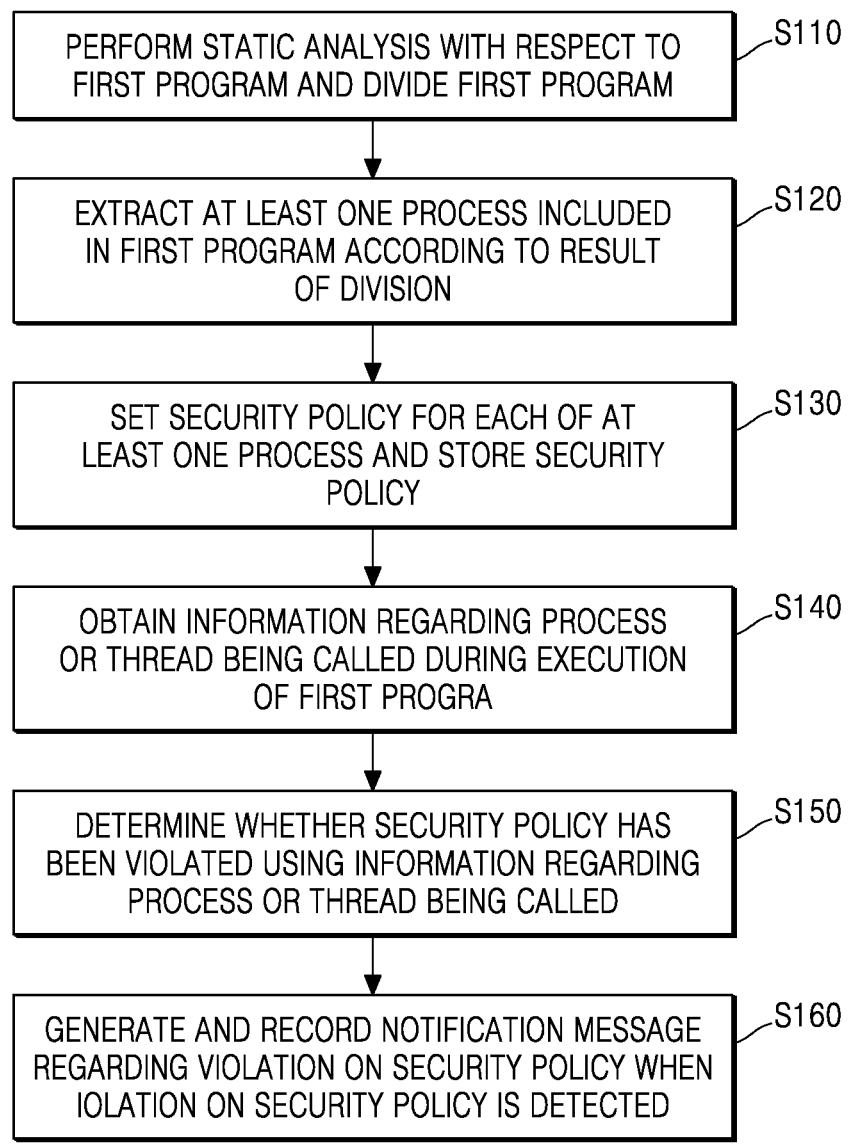
FIG. 4 is a flowchart for describing a method of setting security, according to an embodiment.

The security policy establisher 1213 may divide the test program into a first region (Main and foo, see FIG. 7), a second region (fork and foo2, see FIG. 7), a third region (pthread and foo3, see FIG. 7), and a fourth region (fork, foo4, see FIG. 4). The security policy establisher 1213 may establish a security policy corresponding to each of the aforementioned regions.

The monitor 1214 may obtain information regarding the programs being executed. The monitor 1214 may obtain execution information regarding the programs executed in the security setting device 100. The monitor 1214 may be implemented to obtain only information regarding the process, thread, or the like regarding the security policy that has been set. The monitor 1214 may obtain execution information of the programs executed through other monitoring devices included in the device, and may determine information regarding the process or thread, in which the security policy is violated, from the information that has been obtained.

To apply the security policy that has been established, the monitor 1214 may monitor information regarding execution of the program. The monitor 1214 may generate the monitored result as data.

The violation processor 1215 may obtain information regarding the process or thread called from the monitor 1214, and may determine whether the security policy has been violated, based on the information regarding the process or thread. The violation processor 1215 may detect violation of the process or thread based on the following: whether each process or thread is called at an inappropriate time point; whether a subject called by the each process or thread is inappropriate; whether a subject calling the each process or thread is inappropriate; whether an input value of the each process or thread is inappropriate; and whether an output value of the process or thread is inappropriate.

The violation processor 1215 may process violation of the process according to violation process history that has been set. For example, in response to detection of violation on the security policy in the first process, the violation processor 1215 may store, as log data, information regarding the violation on the security policy by the first process. In response to detection of violation on the security policy in the second process, the violation processor 1215 may pause execution of the second process. In response to detection of violation on the security policy in the third process, the violation processor 1215 may generate a notification message, which includes information regarding violation on the security process in the third process, and transmit the notification message to a terminal or an address of the manager. In response to detection of violation on the security policy in the fourth process, the violation processor 1215 may pause execution of the fourth process and stand-by additional instructions, and when instructions for execution or pause are received, may process the execution of the fourth process according to the instructions that have been received. Instructions for execution or pause may be obtained from a manager for the fourth process. Here, the manager may include a device of the manager, an account of the manager, and the like.

FIG. 4 is a flowchart for describing a method of setting security, according to an embodiment.

As shown in FIG. 4, in S110, the security setter 121 may split the first program in smaller units by performing static analysis with respect to the first program. The first program may be split into units such as processes or threads, but is not limited thereto and may be split into more various methods. In another embodiment, the security setter 121 may analyze authority and/or resources for each thread and/or process identified by using config file (CFG) and/or Call graph and the like.

Here, static analysis indicates analyzing a program without execution, and the static analysis may be executed as a type of versions of a source code, or may be analyzed in an object file type. An automation tool may be used for static analysis. The security setter 121 may perform static analysis with respect to a program by using a compiler.

In S120, the security setter 121 may extract one or more processes or threads included in the first program, according to a result of the static analysis.

The security setter 121 may establish a security policy for each of the one or more processes or threads and store the security policy. Here, the security policy may include conditions when the processes or threads are called or executed. The security policy may include: conditions regarding a time point at which a process or thread is called; conditions regarding a subject calling the process or thread; conditions regarding an object called by the process or thread; conditions regarding input values of the process or thread; conditions regarding output values of the process or thread, and the like.

The security setter 121 may check information on the use of a system call function or the like in the program by statically analyzing the program. The security setter 121 may set executable code sections such as child processes and child threads included in the program by statically analyzing the program. The security setter 121 may establish a security policy for each process or each thread using such an executable code section. Here, the system call function is an interface for approaching kernels in response to requests of an application program with respect to the service provided by the kernel in an operating system, and may include, for example, fork ( ), vfork ( ), pthread ( ), and the like. Examples of the system call function may vary according to type of an operating system of the device. A system call may indicate calling and using a routine of the operating system with respect to functions that are not provided in a programming language. Types of the system call may include process control, file manipulation, device management, device management, information maintenance, communication, and the like.

In S130, the security setter 121 may establish a security policy for each process or each thread based on the authority and/or resource that has been identified.

The security setter 121 may set the security policy for each process or each thread by organizing one or more processes or threads based on initial addresses of one or more processes or threads included in the first program. That is, the security policy of each process may be established based on an initial address value, a required authority value, a required resource value, and the like. In another embodiment, the security setter 121 may update the security policy such that a new security policy is applied for each start of the process or thread.

In S140, the security setter 121 may obtain information regarding the program executed. The security setter 121 may obtain information regarding executions of the programs being executed in the security setting device 100. The security setter 121 may be implemented to only obtain information regarding the process, the thread, or the like regarding the security policy that has been set. The security setter 121 may obtain execution information of the programs executed through other monitoring devices included in the device, and may determine information regarding the process or thread, in which the security policy is violated, from the information that has been obtained.

To apply the security policy that has been set, the security setter 121 may monitor information regarding execution of the programs.

In S150, the security setter 121 may obtain information regarding the process or thread being called, and may determine whether the security policy has been violated, based on the information regarding the process or thread. The security setter 121 may detect violation in the process or thread based on the following: whether each process or thread is called at an inappropriate time point; whether a subject called by the each process or thread is inappropriate; whether an input value of the each process or thread is inappropriate; and whether an output value of the process or thread is inappropriate. The meaning of inappropriate may be determined by whether it is out of a preset normal range or does not match preset reference values.

In S160, the security setter 121 may process violation of the process according to violation process history that has been set. For example, in response to detection of violation on the security policy in the first process, the security setter 121 may store, as log data, information regarding the violation on the security policy in the first process. In response to detection of violation on the security policy in the second process, the security setter 121 may pause execution of the second process. In response to detection of violation on the security policy in the third process, the security setter 121 may generate a notification message, which includes information regarding violation on the security process in the third process, and may transmit the notification message to a terminal or an address of the manager. In response to detection of violation on the security policy in the fourth process, the security setter 121 may pause execution of the fourth process and stand-by additional instructions, and when instructions for execution or pause are received, may process the execution of the fourth process according to the instructions that have been received. Instructions for execution or pause may be obtained from a manager for the fourth process. Here, the manager may include a device of the manager, an account of the manager, and the like.

Figure 5:
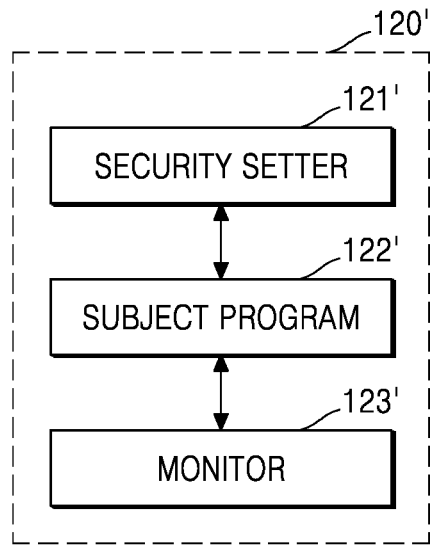
FIG. 5 is a block diagram of a memory according to another embodiment.
Figure 6:
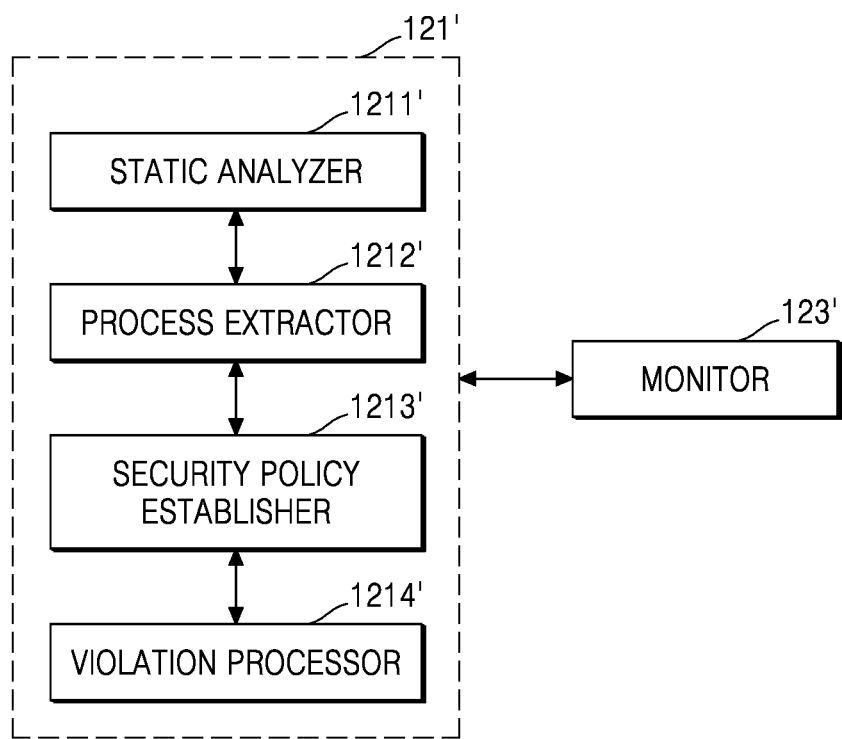
FIG. 6 is a diagram for describing a structure and operations of a security setter included in the memory shown in FIG. 5.

FIG. 5 is a block diagram of a memory 120' according to another embodiment, and FIG. 6 is a diagram for describing a structure and operations of a security setter 121' included in the memory 120' shown in FIG. 5.

The memory 120' of the security setting device, according to other embodiments, may include the security setter 121', a subject program 122', and a monitor 123'.

The security setter 121' may obtain information regarding execution of the program from the monitor 123' located outside the security setter 121'. The security setter 121' may obtain, from the monitor 123', information regarding execution of the subject program 122'.

The monitor 123' may obtain information regarding the program being executed. The monitor 123' may obtain execution information regarding the programs being executed in the security setting device 100. The monitor 123' may be implemented to obtain only information regarding the process, thread, or the like regarding the security policy that has been set. The monitor 123' may obtain execution information of the programs executed through other monitoring devices included in the device, and may determine information regarding the process or thread, in which the security policy is violated, from the information that has been obtained.

The security setter 121' may obtain, from the monitor 123', information regarding the process or thread being called, and may determine whether the security policy has been violated, based on the information regarding the process or thread. The security setter 121' may detect violation in the process or thread based on the following: whether each process or thread is called at an inappropriate time point; whether a subject called by the each process or thread is inappropriate; whether an input value of the each process or thread is inappropriate; and whether an output value of the process or thread is inappropriate.

As shown in FIG. 6, the security setter 121' may include a static analyzer 1211', a process extractor 1212', a security policy establisher 1213', and a violation processor 1214'.

The static analyzer 1211' may split the first program in smaller units (process, threads) by performing static analysis with respect to the first program. The first program may be split into units such as processes or threads, but is not limited thereto and may be split into more various methods.

Here, static analysis indicates analyzing a program without execution, and the static analysis may be executed as a type of versions of a source code, or may be analyzed in an object file type. An automation tool may be used for static analysis.

The static analyzer 1211' may perform static analysis with respect to a program by using a compiler.

The process extractor 1212' may extract one or more processes or threads included in the first program, according to a result of the static analysis. The process extractor 1212' may obtain information regarding a process or thread called when the first program is executed.

The security policy establisher 1213' may set a security policy for each of the one or more processes or threads and store the security policy using the obtained data. The information regarding the process or thread may include information obtained while each process or thread is called or executed. The information about the process or thread may include information about a calling target, information about a called target, information about an input value, information about an output value, and the like. The security policy may be set as a condition for a process or a thread based on the above information. Here, the condition includes condition regarding a time point at which a process or thread is called; condition regarding a subject calling the process or thread; condition regarding an object called by the process or thread; condition regarding an input value of the process or thread; condition regarding an output value of the process or thread, and the like.

The security policy establisher 1213' may check information on the use of a system call function or the like in the program by statically analyzing the program. The security policy establisher 1213' may set executable code sections such as child processes and child threads included in the program by statically analyzing the program. The security policy establisher 1213' may establish a security policy for each process or each thread using such an executable code section. Here, the system call function is an interface for approaching kernels in response to requests of an application program with respect to the service provided by the kernel in an operating system, and may include, for example, fork ( ), vfork ( ), pthread ( ), and the like. Examples of the system call function may vary according to type of an operating system of the device. A system call function may indicate calling and using a routine of the operating system with respect to functions that are not provided in a programming language. Types of the system call function may include process control, file manipulation, device management, device management, information maintenance, communication, and the like.

The security policy establisher 1213' may divide the test program into a first region (Main and foo, see FIG. 7), a second region (fork and foo2, see FIG. 7), a third region (pthread and foo3, see FIG. 7), and a fourth region (fork, foo4, see FIG. 4). The security policy establisher 1213' may establish a security policy corresponding to each of the aforementioned regions.

The static analyzer 1211' may identify authority and/or resources for each thread and/or process identified using CGF and/or Call graph and the like. The security policy establisher 1213' may establish the security policy for each process or thread, based on the authority and/or resource confirmed by the static analyzer 1211'.

The security policy establisher 1213' may set the security policy for each process or each thread by organization based on initial addresses of one or more processes or threads included in the first program. That is, the security policy of each process may be established based on an initial address value, a required authority value, a required resource value, and the like. In another embodiment, the security policy establisher 1213' may update the security policy such that a new security policy is applied for each start of the process or thread.

The monitor 123' may obtain information regarding the program being executed. The monitor 123' may obtain execution information regarding the programs being executed in the security setting device 100. The monitor 123' may be implemented to only obtain information regarding the process, thread, or the like regarding the security policy that has been set. The monitor 123' may obtain execution information of the programs executed through other monitoring devices included in the device, and may determine information regarding the process or thread, in which the security policy is violated, from the information that has been obtained.

To apply the security that has been established, the monitor 123' may monitor information regarding execution of the program.

The violation processor 1214' may obtain, from the monitor 123', information regarding the process or thread being called, and may determine whether the security policy has been violated, based on the information regarding the process or thread. The violation processor 1214 may detect whether the process or thread has been violated based on the following: whether an initial address of each process or each thread is appropriate; whether a function called in each process or each thread is included in the authority; whether a time point at which each process or thread is called is inappropriate; whether a subject called by each process or thread is inappropriate; whether a subject calling each process or thread is inappropriate; whether an input value of each process or thread is inappropriate; and whether an output value of a process or thread is inappropriate.

The violation processor 1214' may process violation in the process according to the violation process history that has been set. For example, in response to detection of violation on the security policy in the first process, the violation processor 1214' may store, as log data, information regarding the violation on the security policy in the first process. In response to detection of violation on the security policy in the second process, the violation processor 1214' may pause execution of the second process. In response to detection of violation on the security policy in the third process, the violation processor 1214' may generate a notification message, which includes information regarding violation on the security process in the third process, and transmit the notification message to a terminal or an address of the manager. In response to detection of violation on the security policy in the fourth process, the violation processor 1214' may pause execution of the fourth process and standby additional instructions, and when instructions for execution or pause are received, may process the execution of the fourth process according to the instructions that have been received. Instructions for execution or pause may be obtained from a manager for the fourth process. Here, the manager may include a device of the manager, an account of the manager, and the like.

Figure 7:
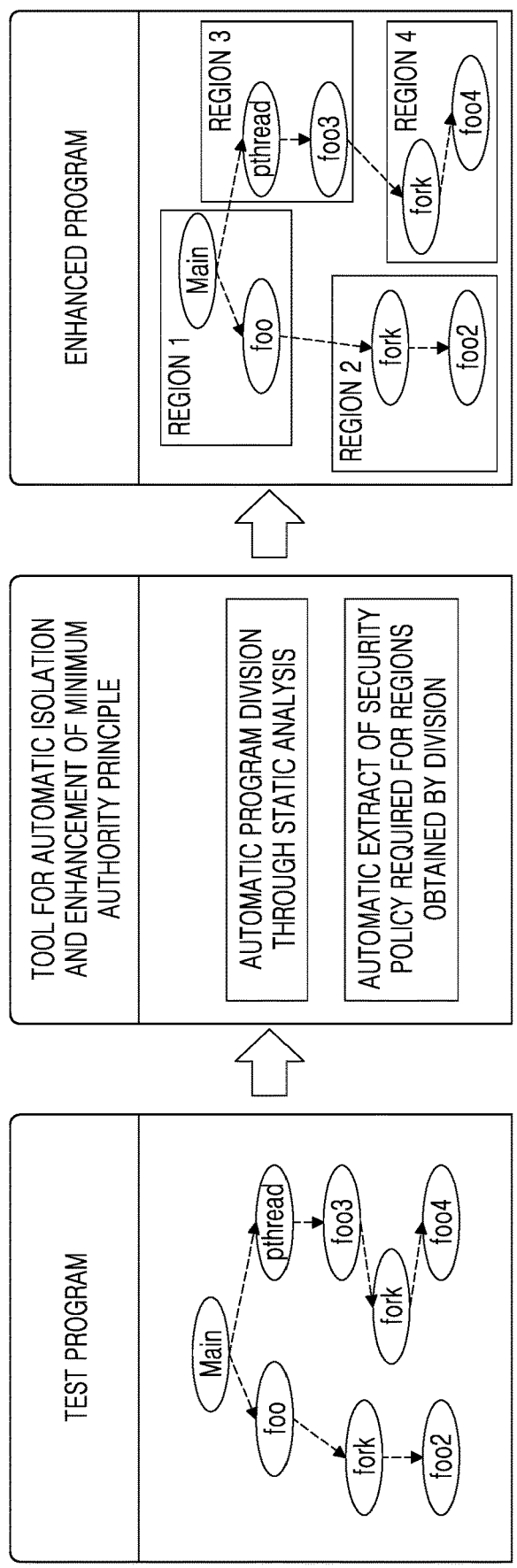
FIG. 7 is a diagram for describing operations of the security setter.

FIG. 7 is a diagram for describing operations of the security setter.

The security setters 121 and 121' may perform static analysis with respect to the test program and divide the program into one or more processes or one or more threads. As shown in FIG. 7, the test program may have a call history of a process and thread, for example, main→foo→fork-→foo2 and Main→pthread→foo3→fork→foo4. The main function may call foo, foo may call fork, and fork may call foo2. The main function may call pthread, pthread calls foo3, foo3 calls fork, and fork calls foo4. That is, the security setters 121 and 121' may extract processes or threads called by the program such as Main, foo, fork, foo2, pthread, foo3, fork, foo4, and the like.

The security setters 121 and 121' may divide a program through static analysis, and may automatically extract security policies for regions (processes or threads) that have been divided.

According to embodiments, the security setters 121 and 121' may divide the regions into the first region (Main, foo), the second region (fork, foo2), the third region (pthread, foo3), and the fourth region (fork, foo4) based on the system calling, and may establish a security policy corresponding to each of the aforementioned regions.

The device and/or system described above may be implemented as hardware components, software components, and/or combinations of hardware components and software components. The device and components described in the embodiments may be implemented using at least one general-purpose computer or dedicated computer, such as a processor, a controller, an arithmetic logic unit (ALU), a digital signal processor, a microcomputer, a field programmable gate array (FPGA), a programmable logic unit (PLU), a microprocessor, or any other devices capable of executing and instructions and respond thereto. The processor may execute an operating system (OS) and one or more software applications executed on the OS. In addition, the processor may access, store, manipulate, process, and generate data in response execution of the software. For convenience of understanding, it may be described that only one processor has been used. However, those skilled in the art may understand that the processor may include a plurality of processing elements and/or several types of processing elements. For example, the processor may include a plurality of processors, or may include one processor and one controller. In addition, other processing configurations such as a parallel processor are also available.

Software may include a computer program, a code, an instruction, or a combination of at least one thereof, and may configure a processor to operate as desired, or may separately or collectively instruct the processor. To be interpreted by the processor or provide instruction or data to the processor, software and/or data may be eternally or temporally embodied in certain types of machines, components, physical devices, virtual equipment, computer storage mediums or devices, or signal waves being transmitted. The software may also be distributed over network-coupled computer systems such that the software may be stored or executed in a distributed manner. Software and data may be stored in at least one computer-readable recording medium.

Methods according to the embodiments may be embodied in forms of program instructions executable through various computer means and may be recorded in a computer-readable recording medium. A computer-readable medium may separately or collectively include program instructions, data files, data structures, and the like. The program instructions recorded on the medium may be specially designed and constructed for the embodiments or may be known to and usable by those skilled in the art. Examples of the computer-readable recording medium include storage media such as magnetic media (e.g., hard discs, floppy discs, or magnetic tapes), optical media (e.g., compact disc-read only memories (CD-ROMs) or digital versatile discs (DVDs)), magneto-optical media (e.g., floptical discs), and hardware devices that are specially configured to store and carry out program commands (e.g., ROMs, RAMs, or flash memories). Examples of the program commands include a high-level language code that may be executed by a computer using an interpreter as well as a machine language code made by a computer. The aforementioned hardware devices may be configured to operate as one or more software modules to carry out operations of the embodiments, and vice versa.

According to embodiments, implemented are a method of security setting to protect an electronic device from external attacks by performing static analysis with respect to the programs to set security policies for processes included in the programs and monitor whether the security policies have been violated, a security setting device, and a computer program stored in a recording medium to execute the method. However, the scope of the embodiments are not limited thereto.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

I claim:

1. A method of setting security to set a per-process security policy, the method comprising:
    dividing a first program by performing static analysis with respect to the first program, by a security setter of an electronic device;
    extracting one or more processes included in the first program according to a result of the dividing of the first program, by the security setter;
    setting a security policy for each of the one or more processes and storing the storage policy, by the security setter;
    obtaining information regarding a process or thread being called when the first program is executed, by the security setter;
    determining whether the security policy has been violated using the information regarding the process or thread being called, by the security setter;
    generating and recording a notification message regarding the violation on the security policy, when violation on the security is detected as a result of determination by the security setter; and
    transmitting, by the security setter, the notification message to an address of a preset manager.

2. The security setting method of claim 1, wherein the information regarding the process or thread being called comprises at least one of information regarding a calling time point, an input value, and an output value.

3. The security setting method of claim 1,
    wherein, in the determining whether the security policy has been violated, the determining is based on at least one of:
    whether the first process is executed in a section other than a use code section of the first process; whether an input value of the first process exceeds a preset input normal range; whether an output value of the first process exceeds a preset input normal range; and a use resource during execution of the first process exceeds a preset resource normal range.

4. The security setting method of claim 1,
    wherein the storing of the security policy comprises
    setting, by the security setter, a security policy according to an operating system using a table regarding security of the operating system installed in the electronic device.

5. The security setting method of claim 1,
wherein the extracting of the one or more processes comprises
extracting, by the security setter, a process or thread calling the system, from among the processes and threads of the first program.

6. The security setting method of claim 1,
wherein the obtaining of the information regarding the process or thread being called comprises
obtaining information regarding the process or thread called by a monitor included in the electronic device.

7. The security setting method of claim 1,
further comprising, after the generating and recording of the notification message, pausing execution of the first program and not executing the first program in spite of an instruction for execution of the first program, by the security setter.

8. A computer program stored in a non-transitory computer-readable storage medium to execute the method of claim 1 by using a computer.

9. A security setting device comprising:
a memory configured to store one or more computer-readable instructions and a processor configured to execute the one or more computer-readable instructions stored in the memory,
wherein the processor is further configured to
perform static analysis with respect to a first program and divide the first program,
extract one or more processes included in the first program, according to a result of the division,
set a security policy for each of the one or more processes, store the security policy, and obtain information regarding a process or thread being called during execution of the first program,
determine whether the security policy has been violated, by using the information regarding the process or thread being called, and
generate and record a notification regarding the violation on the security policy and transmit the notification message to an address of a preset manager, when the violation on the security policy is detected as a result of the determining whether the security policy has been violated.

10. The security setting device of claim 9, wherein the information regarding the process or thread being called comprises at least one of information regarding a call time point, an input value, and an output value.

11. The security setting device of claim 9,
wherein the processor is further configured to determine at least one of the following: whether the first process is executed in a section other than a use code section of the first process; whether an input value of the first process exceeds a preset input normal range; whether an output value of the first process exceeds a preset output normal range; and a use resource during execution of the process exceeds a preset resource normal range.

12. The security setting device of claim 9, wherein the processor is further configured to set a security policy according to an operating system that has been installed, by using a security-related table of the operating system.

13. The security setting device of claim 9, wherein the processor is further configured to extract a process or thread calling a system, from among processes or threads of the first program.

14. The security setting device of claim 9, wherein the processor is further configured to obtain information regarding the process or thread called by a monitor included in the electronic device.

15. The security setting device of claim 9, wherein the processor is further configured to pause execution of the program and not to execute the first program in spite of an instruction to execute the first program.

* * * * *